United States Patent
Etter et al.

(10) Patent No.: US 6,760,435 B1
(45) Date of Patent: Jul. 6, 2004

(54) METHOD AND APPARATUS FOR NETWORK SPEECH ENHANCEMENT

(75) Inventors: Walter Etter, Wayside, NJ (US); Chin S. Chuang, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/500,191

(22) Filed: Feb. 8, 2000

(51) Int. Cl.[7] .......................... H04M 9/08; H04M 1/00; H04M 9/00

(52) U.S. Cl. .......................... 379/406.01; 379/390.03; 379/406.05; 379/406.12

(58) Field of Search .......................... 379/390.03, 392, 379/406.01, 406.05, 406.06, 406.08, 406.12; 370/286, 289, 290, 291

(56) References Cited

U.S. PATENT DOCUMENTS

| | | | |
|---|---|---|---|
| 4,829,565 A | | 5/1989 | Goldberg .................... 379/390 |
| 5,485,515 A | | 1/1996 | Allen et al. .................. 379/391 |
| 5,524,148 A | | 6/1996 | Allen et al. .................. 379/391 |
| 5,526,419 A | | 6/1996 | Allen et al. .................. 379/387 |
| 5,528,687 A | * | 6/1996 | Tanaka et al. ......... 379/406.12 |
| 5,553,134 A | | 9/1996 | Allen et al. .................. 379/387 |
| 5,587,998 A | * | 12/1996 | Velardo et al. ............. 370/289 |
| 5,633,936 A | * | 5/1997 | Oh .............................. 381/66 |
| 5,796,819 A | * | 8/1998 | Romesburg ............ 379/406.09 |
| 5,933,495 A | * | 8/1999 | Oh ........................ 379/406.08 |
| 5,937,060 A | * | 8/1999 | Oh ........................ 379/406.14 |
| 6,125,179 A | * | 9/2000 | Wu ......................... 379/388.01 |
| 6,148,078 A | * | 11/2000 | Romesburg ............ 379/406.07 |
| 6,160,886 A | * | 12/2000 | Romesburg et al. ... 379/406.05 |
| 6,185,300 B1 | * | 2/2001 | Romesburg ............ 379/406.09 |
| 6,421,377 B1 | * | 7/2002 | Langberg et al. ........... 375/222 |
| 6,487,257 B1 | * | 11/2002 | Gustafsson et al. ......... 375/285 |
| 6,560,332 B1 | * | 5/2003 | Christensson et al. . 379/406.05 |
| 6,591,234 B1 | * | 7/2003 | Chandran et al. ........... 704/225 |

\* cited by examiner

*Primary Examiner*—Binh Tieu

(57) ABSTRACT

An apparatus for enhancing intelligibility of a voice signal in a noisy environment includes a first noise estimator which estimates a far-end noise component from the far-end signal, and a second noise estimator which estimates a near-end noise component from the near-end signal. A noise reduction calculator determines a noise reduction gain from the estimated far-end noise, and an echo gain calculator determines an echo control gain. A master gain calculator combines both the echo control gain and the noise control gain into a master gain which is applied to the far-end signal. A comfort noise generator applies the pre-set minimum threshold of the master gain and constantly matches the spectrum of the far-end noise to synthesize a background noise for selectively mixing onto the far-end signal when echo is determined. Echo is determined based on a comparison of the near-end signal and the far-end signal spectra and by compensating the total gain applied. An automatic level controller adjusts the far-end signal responsive to the far-end signal level, and a noise compensator adjusts the far-end signal level responsive to the near-end noise, both adjustments being responsive to the identification of the far-end signal as either speech or noise.

12 Claims, 2 Drawing Sheets

METHOD AND APPARATUS FOR NETWORK SPEECH ENHANCEMENT

BACKGROUND OF THE INVENTION

The present invention relates to the communications arts. It finds particular application in conjunction with improving intelligibility in noisy environments on both a near-end and a far-end of a network and it will be described with particular reference thereto. However, it is to be understood that the invention may find further application outside of the network environment, such as in telecommunications components themselves, or in individual gateways or portals to a telecommunications network.

Many present day communication systems provide unpleasant speech quality in the presence of background noise on both a transmit or far-end, and on a receive or near-end. Additional complexity is introduced by the varied sources of noise ranging from noisy background environments to acoustic and/or electrical echoes. With respect to background noise, the problem potentially exists on both the near-end and the far-end of the communications network. For example, consider a cellular telephone user making a call from a busy street corner. Typical communication systems are not able to adequately distinguish background noise from voice information, with the result that the system attempts to transmit both voice and noise over the communications link. At the other end of the link, this transmitted noise degrades the quality of the received voice signal. Compounding the problem, many such devices incorporate speech coders so as to reduce the bit rate that must be transmitted over the communications channel. Although bit rate reduction is desirable in that it permits the capacity of the wireless communication system to be increased, it renders the communication system increasingly vulnerable to speech quality degradations in the presence of background noise.

Background noise at the receiving end or near-end of the network can also impair intelligibility of the voice signal. For example, consider a telephone call placed to a factory office. High levels of ambient factory noise can degrade the intelligibility of the voice signal received, sometimes requiring the caller to repeat information.

Other known sources of undesirable noise include acoustic echo caused by, for example, a transmitter both receiving a voice signal directly and through echo paths. While prior art echo controllers exist, they typically function by detecting the echo and canceling the signal. However, typical telecommunications users are uncomfortable with periods of total silence interspersed within a voice call. Some systems introduce a white noise signal instead of the silence generated upon echo detection which undesirably only match the noise power but not the spectrum. In other words, the white noise sounds different, or has different spectral characteristics, than the ambient noise.

The present invention contemplates a new and improved method and apparatus to improve intelligibility of a speech signal transmitted over a communications network which overcomes the above referenced problems and others.

SUMMARY OF THE INVENTION

In accordance with one aspect of the present invention, a method of processing a signal between a near-end and a far-end of a telephone network includes receiving both a near-end signal and a far-end signal. A near-end noise component is estimated from the near-end signal, while a far-end noise component is estimated from the far-end signal. Based on the near-end noise component and the far-end noise component, the far-end signal is adjusted to generate a modified signal.

In accordance with another aspect of the present invention, the far-end signal is adjusted by steps including determining a gain as a function of the estimated far-end noise component, and applying the gain to the far-end signal.

In accordance with another aspect of the present invention, the determining a gain step includes determining a first gain derived from the estimated far-end noise component and a second gain derived from the near-end signal and the far-end signal. The first and second gains are then combined and thresholded.

In accordance with another aspect of the present invention, the first gain is determined by comparing a set of critical frequency bands and the estimated far-end noise component.

In accordance with another aspect of the present invention, the second gain is determined by applying a near-end gain compensation to the determining of the second gain.

In accordance with another aspect of the present invention, the far-end signal is adjusted by selectively mixing a thresholded estimated far-end noise component into the far-end signal.

In accordance with another aspect of the present invention, the far-end noise component is estimated by splitting the far-end signal into a uniform set of frequency bands and converting those bands to a set of critical frequency bands selected for characteristics including the human auditory system. Samples of the set of critical frequency bands are then prefiltered to discard a sample minima shorter than a specified minimum. The plurality of independent filterings are performed to provide an estimate of a smallest sample in a sample set where the estimated far-end noise component includes the estimate of the smallest sample.

In accordance with another embodiment of the present invention, a method of processing a signal to enhance intelligibility in noisy environments includes in the frequency domain estimating a noise component of the signal and calculating a first gain based on the estimated noise component. Still in the frequency domain, a second gain is determined as a function of the far-end echo. The signal is then adjusted as a function of the first and second gain producing a modified signal.

In accordance with another aspect of the present invention, the method further includes in the time domain, adjusting the modified signal as a function of signal level, dynamic range, and identification of the signal as either speech or noise. A gain is applied to compensate for a noise component estimated on the near-end signal.

In accordance with another aspect of the present invention, the method further includes in the frequency domain, combining the first and the second gain, resulting in a master gain, and then thresholding that gain.

In accordance with another aspect of the present invention, the method further includes in the frequency domain estimating a noise component of the near-end signal, and in the time domain, applying a third gain to the signal, where the third gain is a function of the estimated near-end noise.

In accordance with another embodiment of the present invention, an apparatus for enhancing intelligibility of a far-end signal in noisy environments includes a first noise estimator which estimates a far-end noise component from the far-end signal. A first calculator then determines a first gain as a function of the estimated far-end noise component. A gain filter applies the calculated first gain to the far-end signal, and an automatic level controller adjusts the far-end signal as a function of signal level, dynamic range of the system, and identification of the signal as speech or noise.

In accordance with another aspect of the present invention, the apparatus further includes a second noise estimator which estimates a near-end noise component in a near-end signal. A noise compensator then applies a second gain to the far-end signal responsive to the estimated near-end noise component.

In accordance with another aspect of the present invention, the first calculator includes a noise reduction gain calculator which calculates a noise reduction gain to reduce far-end noise in the signal. An echo gain calculator calculates an echo control gain to reduce echos detected in the apparatus. A master gain calculator is also provided which combines the echo control gain and the noise control gain into a master gain.

In accordance with another aspect of the present invention, the first calculator also includes a thresholder to confine the master gain to a selected limit.

One advantage of the present invention resides in improved intelligibility in noisy environments provided by both noise reduction and noise compensation. Noise reduction addresses the noise in the signal itself by spectrally attenuating its components. Noise compensation, on the other hand, addresses the acoustic background noise that a person is exposed to while listening to another person on the phone.

Yet another advantage of the present invention resides in the determination of echo based on at least one processed signal by compensating the processing gain.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those of skill in the art.

BRIEF DESCRIPTION OF THE DRAWINGS

The invention may take form in various components and arrangements of components, and in various of steps and arrangements of steps. The drawings are for purposes of illustrating the preferred embodiments, and are not to be construed as limiting the invention.

DETAILED DESCRIPTION OF THE PREFERRED EMBODIMENTS

Figure 1:
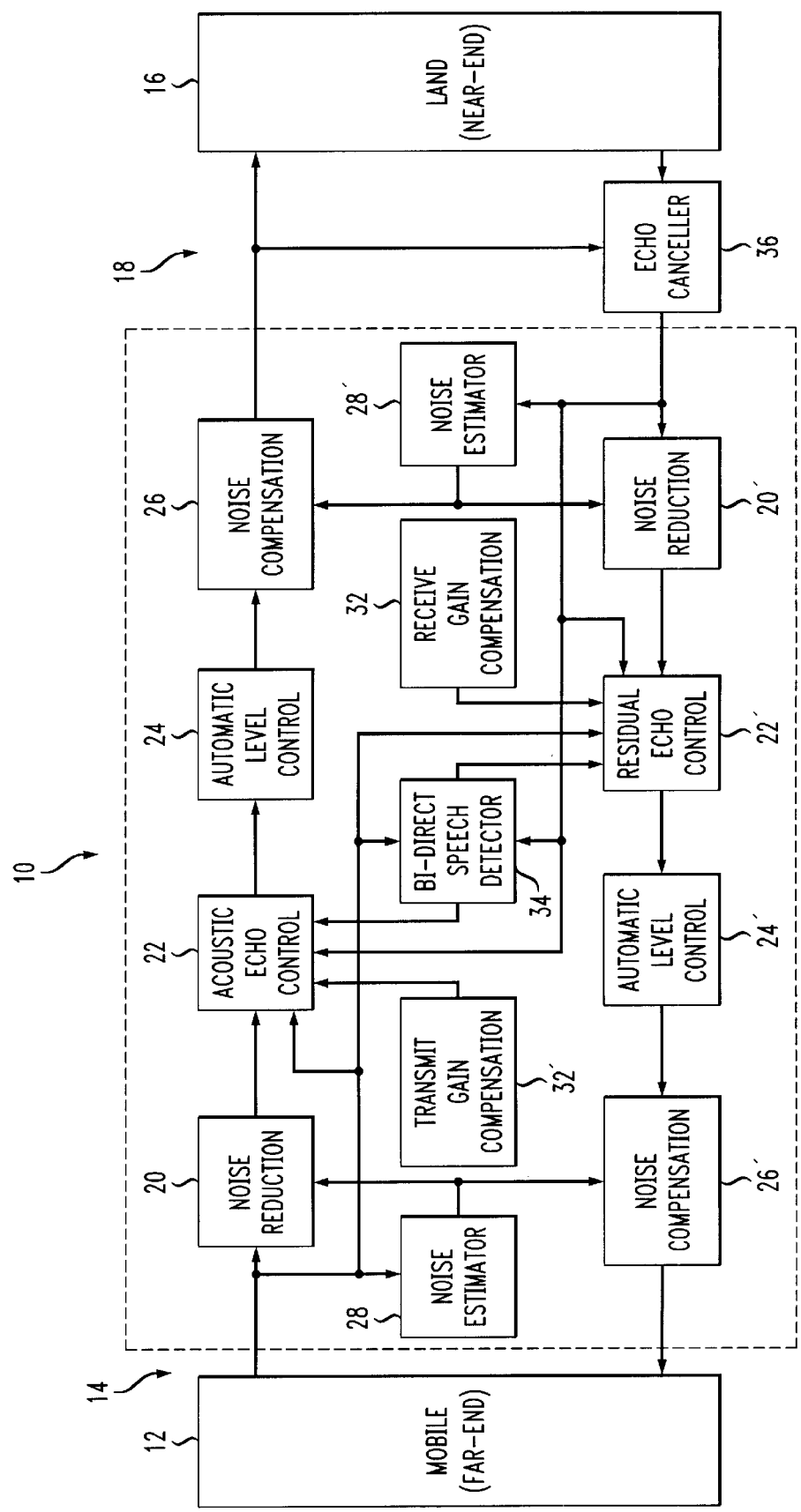
FIG. 1 is a diagrammatic illustration of components within a telecommunications network according to the present invention; and, FIG. 2 is a functional block diagram of a portion of the network of FIG. 1.

With reference to FIG. 1, an exemplary network speech enhancement device 10 includes a telecommunications terminal 12 on a far-end of the network device 10, and a telecommunications terminal 16 on a near-end 18 of the network device 10. Those skilled in the art will appreciate that such a network enhancement device 10 could exist at various locations within, for example, the public switched telephone network, within a private branch exchange, at a mobile switching station, or even within the telecommunications terminals themselves. The speech enhancement device applies four signal enhancement techniques to both received and transmitted signals: noise reduction 20, echo control 22, automatic level control 24, and noise compensation 26. Those skilled in the art will appreciate the symmetry of the device for processing both near-end and far-end signals. Accordingly, a convention of referencing like components with a prime (') is used both to reflect the symmetry of the device and to distinguish near-end processing components from far-end components. In FIG. 1, a cellular phone comprises the telecommunications terminal 12 on a far-end, and a land phone comprises the telecommunications terminal 16 on a near-end. Those skilled in the art recognize the telecommunications terminals 12, 16 merely illustrate an exemplary selection of devices, and that other devices can be substituted with no loss of functionality of the present invention. Likewise, a traditional near-end echo canceller 36 is assumed outside the speech enhancement device 10. As will be further developed below, far-end echo control 22 reduces the acoustic echo originating from the far-end telecommunications terminal 12. On the near-side processing chain, echo controller 22' reduces residual echo that has not been removed by the external echo canceller 36.

Far-end signal noise estimator 28 provides both a noise estimate for the far-end noise reduction 20 and a noise estimate for the near-end noise compensation 26'. Acoustic echo can be determined from the unprocessed near-end signal and the processed far-end signal. Rather than using the processed near-end signal directly, it is derived from the unprocessed near-end signal modified by the total near-end gain. The near-end gain is obtained in the near-end gain compensation block 32' by multiplying the gains of the noise reduction 20', echo control 22', automatic level control 24' and noise compensation 26'. The bi-directional speech detector 34 controls the adaptation of echo controls on both ends by detecting the signal-activity state (near-end talk, far-end talk, double-talk and pauses).

Figure 2:
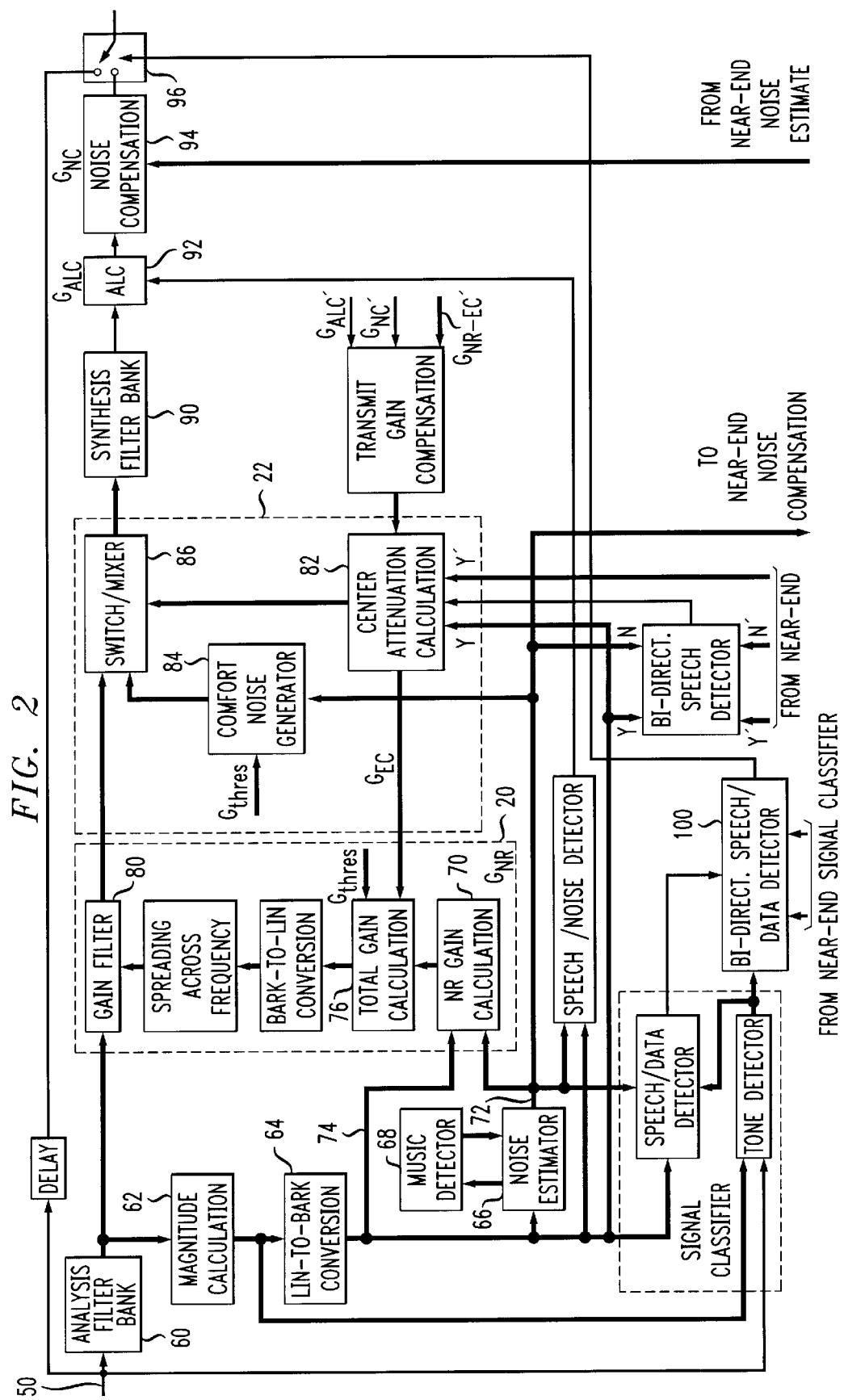

Referring now to FIG. 2 a functional block diagram illustrates the processing taking place on a typical signal. Near-end and far-end processing may be nearly identical. For example, in the system illustrated by FIG. 1, they differ only in the echo control applied. That is, on the far-end echo control is applied to reduce potential acoustic echo from the originating terminal 12. On the near-end however, echo control is applied to reduce residual echos which have not been canceled by the external echo canceller 36.

A far-end signal enters the network device 10 on line 50 where it is split into a set of frequency bands, typically by a fast Fourier transform 60. Conversion to the frequency domain and processing therein is illustrated in FIG. 2 by bold interconnecting lines, while time domain processing is indicated by narrow lines. Accordingly, following conversion to the frequency domain by filter bank 60, the set of thirty two (32) frequency bands are conveyed to a magnitude calculator 62. The choice of thirty two (32) frequency bands however, reflects the optimization between good noise reduction and short delay. Generally, the higher number of channels selected improves the performance of the noise reduction. However, a higher number of channels also increases the delay. While the selection of thirty-two (32) bands is presently preferred, those skilled in the art will recognize that different numbers can also be employed.

Magnitude calculator 62 then calculates the spectral magnitude from the complex output of the Fourier transform 60.

Linear-to-bark converter 64 converts the thirty-two (32) frequency bands to a critical band (a bark scale) to reduce the number of bands processed and align the bands with the frequency resolution of the human auditory system. Presently, the number of bands is reduced to twenty (20) with most combinations occurring in the higher frequency range. The critical bands are then forwarded to a noise estimator 66 which calculates an estimate for the background noise. An exemplary implementation of the background noise estimator 66 is contained in co-pending application Ser. No. 09/107,919. While the background noise estimator 66 tracks stationary signal components, signal components attributable to, for example, music on hold, may bias the background noise estimate. Music detector 68 recognizes music by statistical properties and hinders the noise estimator 66 from adapting to the music. The noise estimate then proceeds to the noise reduction 20.

The noise reduction gain calculator 70 receives both the estimated noise 72 and the entire noisy speech spectrum 74. From these two the gain calculator 70 determines a gain to compensate for the estimated noise 72. The gain calculated is supplied to a master gain calculator 76 which also receives a gain from the echo controller 22. The master gain is obtained by combining the noise reduction gain with the echo controller gain. The combined gain is constrained to a preset threshold allowing the maximum attenuation to be set. The master gain is then converted back to a linear frequency resolution in converter 78 and is then supplied to a spreading filter which smoothes the initial gain array across frequencies. In the gain filter 80, the calculated gain is supplied to the signal in the frequency domain thus reducing noise attributable to far-end background noise and echo. The signal is then supplied to echo controller 22 which includes a center attenuation calculator 82, comfort noise generator 84, and switch 86.

The echo controller 22 employs a modified center clipper, here referred to as center attenuator 82. If acoustic echo is detected, the center attenuator 82 provides a gain according to a center attenuation characteristic. As discussed above, the center attenuation calculator 82 applies a derived gain of the entire near-end processing chain to an unprocessed near-end signal illustrated as Y'. The estimated noise 72 is also supplied to the comfort noise generator 84 within the echo controller 22. For the synthesis of comfort noise, the noise estimate 72 is used and attenuated with a filter determined by a gain threshold. This threshold may be constant over all frequencies, or alternately it may depend on the frequency to allow variable attenuation across frequencies, for example, more attenuation at lower frequencies. A frequency dependent threshold accounts for frequency depending masking effects as will be further described below. The output of both the center attenuation calculator 82 and the comfort noise generator 84 are supplied to the switch/mixer 86. If acoustic echo is detected while near-end speech is absent, the switch/mixer 86 either switches completely to the comfort noise or mixes comfort noise with the signal. To avoid abrupt signal changes, mixing is applied during transition phases (i.e. from no acoustic echo to acoustic echo). In other words, the comfort noise is faded in while the original signal is faded out.

The resulting signal is then sent to a synthesis filter bank 90 to transform the frequency spectrum back into a time domain signal in conventional ways. Automatic level control 92 ensures that the signal level is at an optimum level. In the absence of an automatic level control 92, too low a signal level is likely to lead to intelligibility loss for the listener, while too high a signal level may cause discomfort for the listener and/or additional signal distortions. In addition, the automatic level controller 92 serves to precondition the signal for noise compensation as will be discussed next. Noise compensator 94 adjusts the gain of the far-end signal in response to the noise level estimated at the near-end. The gain of the noise compensator 94 is set to unity in the absence of noise on the near-end and is gradually increased for increasing near-end noise. An output switch mixer 96 is operated by the bi-directional speech/data detector 100 to selectively bypass signal enhancement processing in the case of signaling tones and data. To resume the speech enhancement processing, the enhanced speech phase may be phased in to avoid non-continuous signal jumps.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of processing a signal between a near-end and a far-end of a telephone network, said method comprising:
   receiving a near-end signal and a far-end signal;
   estimating a near-end noise component from the near-end signal;
   estimating a far-end noise component from the far-end signal; and,
   adjusting the far-end signal based on the near-end noise component and the far-end noise component to generate a modified signal comprising:
      determining a first gain derived from the far-end noise component,
      determining a second gain derived from the near-end signal and the far-end signal,
      combining the first and second gain,
      thresholding the combined gain, and,
      applying the combined gain to the far-end signal.

2. The method as set forth in claim 1, wherein the determining a first gain step comprises comparing a set of critical frequency bands and the far-end noise component.

3. The method as set forth in claim 1, wherein the determining a second gain step comprises applying a near-end gain compensation to the determining of the second gain.

4. The method as set forth in claim 1, wherein the estimating a far-end noise component step comprises:
   splitting the far-end signal into a uniform set of frequency bands;
   converting the uniform set of frequency bands to a set of critical frequency bands based on human hearing;
   prefiltering samples of the set of critical frequency bands to discard a sample minima shorter than a specified minimum; and,
   performing a plurality of independent filterings to provide an estimate of a smallest sample in a sample set, where the estimated far-end noise component comprises the estimate of the smallest sample.

5. A method of processing a signal to enhance intelligibility in noisy environments where the signal comprises a frequency domain and a time domain, said method comprising:
   in the frequency domain:
      estimating a noise component of the signal;

calculating a first gain based on the estimated noise component;

determining a second gain as a function of a echo; and, adjusting the signal as a function of the first gain and the second gain, producing a noise-reduced-signal.

6. The method of processing a far-end signal as set forth in claim 5, further comprising:

in the time domain:
adjusting the noise-reduced-signal as a function of signal level, dynamic range of the system and identification of the signal as speech or noise; and, applying a gain compensating for a noise component of a near-end signal.

7. The method of processing a signal as set forth in claim 5, further comprising:

in the frequency domain:
combining the first gain and the second gain, resulting in a master gain; and thresholding the master gain.

8. The method of processing a signal as set forth in claim 6, further comprising:

in the frequency domain, estimating a noise component of a near-end signal; and, in the time domain, applying a third gain to the signal, where the third gain is a function of the estimated near-end noise.

9. An apparatus for enhancing intelligibility of a far-end signal in noisy environments, the apparatus comprising:

a first noise estimator which estimates a far-end noise component from the far-end signal;

a first calculator which determines a first gain as a function of the estimated far-end noise component;

a gain filter which applies the determined first gain to the far-end signal; and, an automatic level controller which adjusts the far-end signal as a function of signal level, dynamic range of the system and identification of the signal as speech or noise.

10. The apparatus as set forth in claim 9, further comprising:

a second noise estimator which estimates a near-end noise component in a near-end signal; and, a noise compensator which applies a second gain to the far-end signal responsive to the estimated near-end noise component.

11. The apparatus as set forth in claim 9, wherein the first calculator comprises:

a noise reduction gain calculator which calculates a noise-reduction gain to reduce far-end noise in the signal;

an echo gain calculator which calculates an echo control gain to reduce echoes detected in the apparatus; and, a master gain calculator which combines the echo control gain and the noise-reduction gain into a master gain.

12. The apparatus as set forth in claim 11, wherein the first calculator further comprises:

a thresholder to confine the master gain to a selected limit.

* * * * *